US008478208B2

(12) United States Patent
Martin, II

(10) Patent No.: US 8,478,208 B2
(45) Date of Patent: *Jul. 2, 2013

(54) CONTROLLING FUNCTIONS OF MOBILE COMMUNICATIONS DEVICES

(71) Applicant: AT&T Mobility II LLC, Atlanta, GA (US)

(72) Inventor: Carl L. Martin, II, Round Rock, TX (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/670,494

(22) Filed: Nov. 7, 2012

(65) Prior Publication Data

US 2013/0072175 A1 Mar. 21, 2013

Related U.S. Application Data

(63) Continuation of application No. 11/943,952, filed on Nov. 21, 2007, now Pat. No. 8,335,501.

(51) Int. Cl.
*H04B 1/40* (2006.01)
(52) U.S. Cl.
USPC .............. 455/88; 455/420; 455/432; 455/419
(58) Field of Classification Search
USPC ................ 455/88, 344, 352, 419, 450, 556.1, 455/575.9; 340/5.61, 825.22, 825.72; 307/10.1, 307/10.6
See application file for complete search history.

(56) References Cited

U.S. PATENT DOCUMENTS

| | | | |
|---|---|---|---|
| 6,829,494 | B2 | 12/2004 | Tanabe |
| 7,183,896 | B2 | 2/2007 | Qualich et al. |
| 2002/0156632 | A1 | 10/2002 | Haynes et al. |
| 2002/0183026 | A1 | 12/2002 | Naruse |
| 2004/0095267 | A1 | 5/2004 | Pruitt |
| 2004/0160911 | A1 | 8/2004 | Zilliacus et al. |
| 2005/0197174 | A1 | 9/2005 | Hasan et al. |
| 2005/0246619 | A1 | 11/2005 | Krause |
| 2006/0073786 | A1 | 4/2006 | Sarkar |
| 2006/0253592 | A1* | 11/2006 | Oashi et al. .................. 709/227 |
| 2006/0282826 | A1 | 12/2006 | Dockser |
| 2007/0024700 | A1* | 2/2007 | Lim et al. .................. 348/14.01 |
| 2007/0094588 | A1 | 4/2007 | Klassen et al. |
| 2007/0115346 | A1 | 5/2007 | Kim et al. |
| 2008/0141244 | A1 | 6/2008 | Kelley |

* cited by examiner

*Primary Examiner* — Kamrin Afshar
*Assistant Examiner* — Marisol Fahnert
(74) *Attorney, Agent, or Firm* — Parks IP Law LLC; Mickki D. Murray Esq.

(57) ABSTRACT

Function-control instructions for controlling a function or feature of a device can be created remotely, locally, or both. A device can receive a function-control instruction or a function-control instruction embedded in received content. Additionally, or alternatively, a function-control instruction can be created locally based on user information or calibration information. Function-control instructions can be passed to an instruction execution application that interprets the function-control instruction. The instruction execution application can pass instructions, based on the function-control instruction, to the device for implementation.

20 Claims, 5 Drawing Sheets

CONTROLLING FUNCTIONS OF MOBILE COMMUNICATIONS DEVICES

TECHNICAL FIELD

The present invention relates generally to the field of mobile communications devices. More particularly, the present invention relates to controlling functions of mobile communications device.

BACKGROUND

With the proliferation of the use of mobile communications devices over the past several years has come a corresponding increase in the complexity of communications devices and their ability to handle complex tasks. Not coincidentally, the average size, resolution, and color depth of communications device displays has increased to support the ever-increasing demands of mobile communications device users.

The increased size, resolution, and color depth of mobile communications device displays has allowed users to use mobile communications devices for many tasks that were previously reserved for personal computers (PCs), and the like. Web browsing, for example, has become more user-friendly on devices with larger displays. While previous generations of devices supported web browsing, devices often displayed text only, and layout and images were not necessarily preserved. With newer devices, however, a web page can look nearly identical on both a mobile communications device, and on a display connected to a PC. Therefore, the amount of content that can be displayed on a mobile communications device display can be substantially identical to the amount of content that can be displayed on a display connected to a PC.

Mobile communications devices typically have many functions that can be customized by a user, a manufacturer, or an authorized technician. Once customized, these customized functions will often be applied uniformly, irrespective of the task for which the device is being utilized at any given time.

For example, many devices include a backlight capability that can be activated to make a device display easier to read. Backlighting a display has one major drawback, namely, that backlighting uses a great deal of energy and can therefore deplete battery charge relatively quickly. To address this problem, backlighting is typically adjustable to reduce the period of time for which backlighting is activated. For example, a backlight can typically be adjusted in the device preferences, or by a device manufacturer, to stay on for a set amount of time after a button on the device is pushed.

Other device functions and features, including, but not limited to, device sounds, power settings, and display settings, are often customizable as well. With respect device sounds, a user can typically select or download audio clips and assign them to desired device functions such as ring tones, feedback tones, message waiting indicators, alerts, alarms, and the like.

SUMMARY

A function-control instruction can be created for controlling any function or feature of a mobile communications device. A file can include one or more function-control instructions, or, in the alternative, a file can itself be one or more function-control instructions. For example, a function-control instruction can be a META tag within a file, such as, for example, a web page.

A file and/or a function-control instruction can be stored on a network device such as, for example, a web server. Alternatively, a network device can be a second mobile communications device. A web server can be located on, or have access to, a variety of other networks. Any number of networks can interface with one another, and, therefore, the network device. One or more of the networks can include a wireless transmitter, such as, for example, a cellular telephone network transmitter, a WI-FI hotspot, a BLUETOOTH transmitter, and the like. One or more wireless transmitters can interface with one or more mobile communications devices. As such, one or more mobile communications devices can interface with a network device via any number of networks.

A network device can transfer a file and/or a function-control instruction to one or more mobile communications devices. Upon receiving a file and/or a function-control instruction, the mobile communications device can analyze the received file and search for a function-control instruction. If a function-control instruction is found, the device can extract the function-control instruction from the received file and pass the function-control instruction to an instruction execution application. The remainder of the file can be executed in the normal fashion.

The instruction execution application can be a software program, application, subroutine, and the like. The instruction execution application can execute the function-control instruction and determine to which function the function-control instruction pertains, and what parameters should be applied to the desired function. The instruction execution application can then pass instructions to the device to execute the desired function in the manner specified by the function-control instruction.

Instead of creating a function-control instruction remotely and passing the function-control instruction to a device, a function-control instruction can be created at the device based on user information or calibration information stored at the device. A software program, application, subroutine, and the like, can function as a function-control instruction generator. User information or calibration information can be applied to any desired function, features, and can be triggered by any event, for example, when the device receives data.

A function-control instruction can be determined based upon the application of user information and/or calibration information to the received data, content, or other trigger event. Instead of, or in addition to, receiving a function-control instruction, the function-control instruction generator can create a function-control instruction, pass it to an instruction execution application, and the instruction execution application can execute the function-control instruction in a manner substantially similar to that explained above.

One contemplated example of applying user information to received data to generate a function-control instruction includes calibrating a function-control instruction generator application by determining a device user's reading speed and applying that reading speed to applied text or web content. When text or content is received, the user's reading speed can be applied to the content to determine how long the user will need to read or view the content. The function-control instruction generator can create a function-control instruction and pass the function-control instruction to an instruction execution application. Another contemplated example includes using a user's ZIP code, or the device's current ZIP code, to retrieve weather, news, traffic, and the like.

Accordingly, an embodiment of the present invention includes a method for remotely controlling a function of a mobile communications device. An instruction execution application is included on a mobile communications device.

A file is stored on a network device. The file is transferred from the network device to the mobile communications device. The mobile communications device extracts one or more function-control instructions included in the transferred file and transfers the function-control instruction to the instruction execution application. The instruction execution application executes the function-control instruction and instructs the device to perform a function as directed by the function-control instruction.

According to an aspect of this or other embodiments, the instruction execution application is stored in a device firmware.

According to an aspect of this or other embodiments, the function-control instruction relates to a device function.

According to an aspect of this or other embodiments, the function-control instruction is a META tag.

According to an aspect of this or other embodiments, the function-control instruction relates to backlighting.

According to an aspect of this or other embodiments, the function-control instruction relates to a device sound.

According to an aspect of this or other embodiments, the function-control instruction relates to a transfer medium.

According to an aspect of this or other embodiments, the file is a webpage.

According to an aspect of this or other embodiments, the webpage is at least partially written in hypertext markup language (HTML).

According to an aspect of this or other embodiments, the network device is a server.

According to an aspect of this or other embodiments, the extracting step is performed by an application residing on the mobile communications device.

According to an aspect of this or other embodiments, the application is a web browser.

According to an aspect of this or other embodiments, the file is one or more function-control instructions.

Another embodiment of the present invention includes a method for remotely controlling a function of a mobile communications device. An instruction execution application is included on a mobile communications device. A function-control instruction generator is also included on a mobile communications device. The function-control instruction generator can apply user-based rules to received content to generate function-control instructions. A generated function-control instruction can be passed to the instruction execution application. The instruction execution application can execute the function-control instruction and can instruct the device to perform a function as directed by the function-control instruction.

According to an aspect of this or other embodiments, the instruction execution application is stored in a device firmware.

According to an aspect of this or other embodiments, the function-control instruction relates to a device function.

According to an aspect of this or other embodiments, the function-control instruction relates to backlighting.

According to an aspect of this or other embodiments, the function-control instruction relates to a device sound.

According to an aspect of this or other embodiments, the function-control instruction generator is a web browser.

Another embodiment of the present invention includes a system for remotely controlling a function of a mobile communications device. The system includes a network storage device for storing a file that includes, or is, a function-control instruction. The system also includes a network node for transferring the file from the network storage device to a mobile communications device. The mobile communications device is configured to recognize a function-control instruction, pass the function-control instruction to an instruction execution application, execute the function-control instruction, and perform a device function according to the function-control instruction.

These and further features of the present invention will be apparent with reference to the following description and attached drawings.

DESCRIPTION

As required, detailed embodiments of the present invention are disclosed herein. It must be understood that the disclosed embodiments are merely exemplary examples of the invention that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present invention. Therefore, specific structural and functional details disclosed herein are not to be interpreted as limiting, but merely as a basis for the claims and as a representative basis for teaching one skilled in the art to variously employ the present invention.

Figure 1:
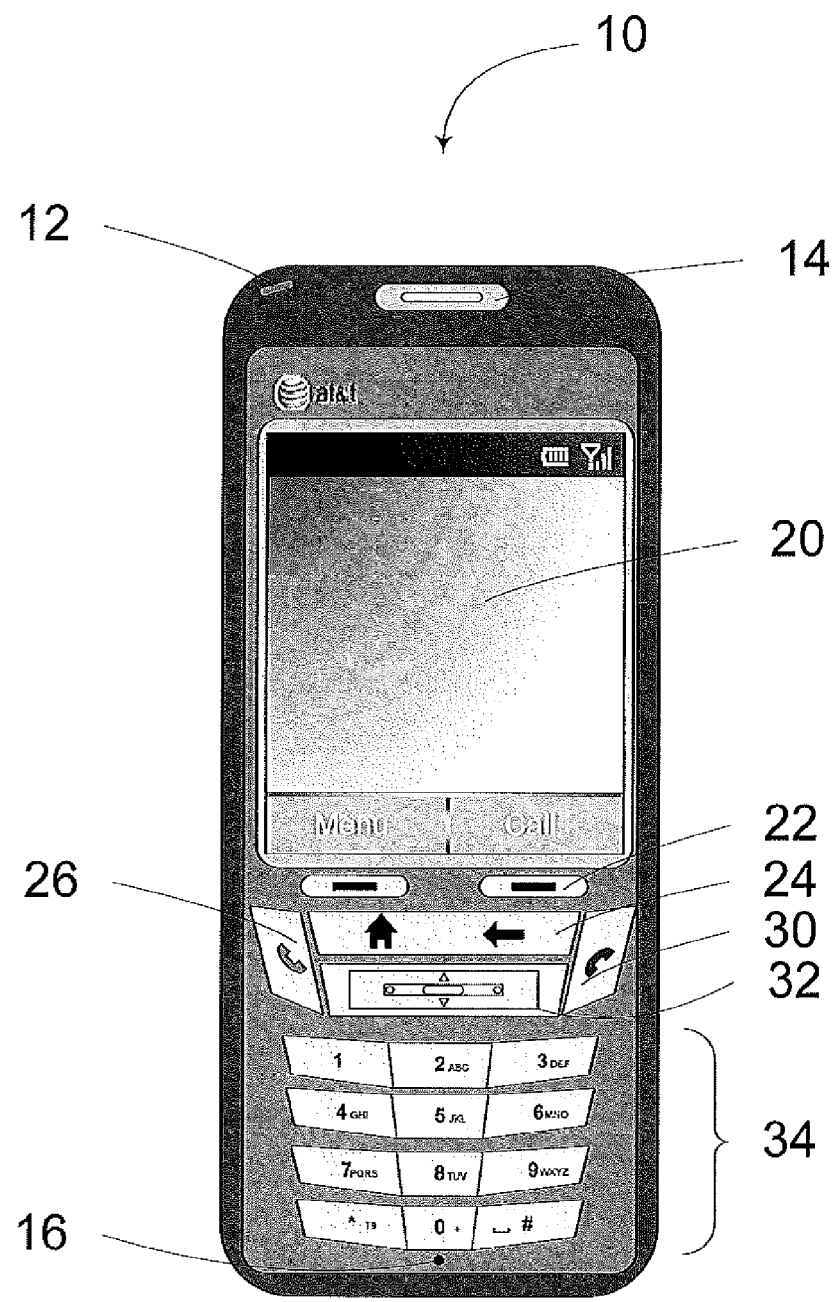
FIG. 1 is a plan view of an exemplary communications device.

Referring initially to FIG. 1, an exemplary electronic device 10 is illustrated. In the illustrated exemplary embodiment, the electronic device 10 is a mobile communications device ("device"). The device 10 can be, far example, a personal digital assistant ("FDA"), a handset, a portable computer, a portable game system, any device capable of receiving a message, combinations thereof, and the like. The device 10 can include an indicator 12. The indicator can be, for example, a light emitting diode (LED) that indicates various status states of the device 10. The device 10 includes a speaker 14 and a microphone 16. The speaker 14 and the microphone 16 collectively and respectively transmit and receive audio signals.

The device 10 includes a display 20 for communicating features and status to the user, and for enabling the user to navigate the control system and use various features of the device. The display 20 may also be used to display, for example, text, images, video, movies, games, streaming video, GPS information, email, Internet files, telephony functions such as Caller ID data, setup functions, menus, music metadata, messages, wallpaper, graphics, voice mail status and/or options, combinations thereof, and the like. It should be understood that a display 20 can be of any desired dimensions, shape, resolution, and color depth.

The display 20 can be a liquid crystal display (LCD) screen, or other suitable device, and can include a backlight capability. A display 20 backlight capability can be provided by any suitable device, including, but not limited to, an electroluminescent panel (ELP), light emitting diodes (LEDs) behind, in front of, or next to a display, an incandescent light source, combinations or equivalents thereof, and the like. Additionally, while the term "backlight" is used, the display 20 can, but does not necessarily, include a light, per se. Instead, the display 20, depending upon the method used to create an image, can operate at a higher intensity or brightness to simulate backlighting. Methods for backlighting, literally or metaphorically, are known in the art, and all methods thereof are intended to be included in the scope of the appended claims.

As illustrated, the device 10 can include a plurality of keys, including softkeys 22, function keys 24, an initiate call key 26, and a terminate call key 30. Some devices can also include a directional key 32. A directional key 32 can allow navigation through various menus and lists and/or can facilitate control of various features of the device. Instead of a directional key, some devices include a joy stick, a roller wheel, a rocker switch, and the like. A mobile communications device 10 generally includes an alpha-numeric keypad 34 for inputting numbers and/or letters while interacting with the device. Although not illustrated, a device 10 can include a touch-sensitive screen instead of, or in addition to, the display 20 and some or all of the illustrated plurality of keys.

Figure 2:
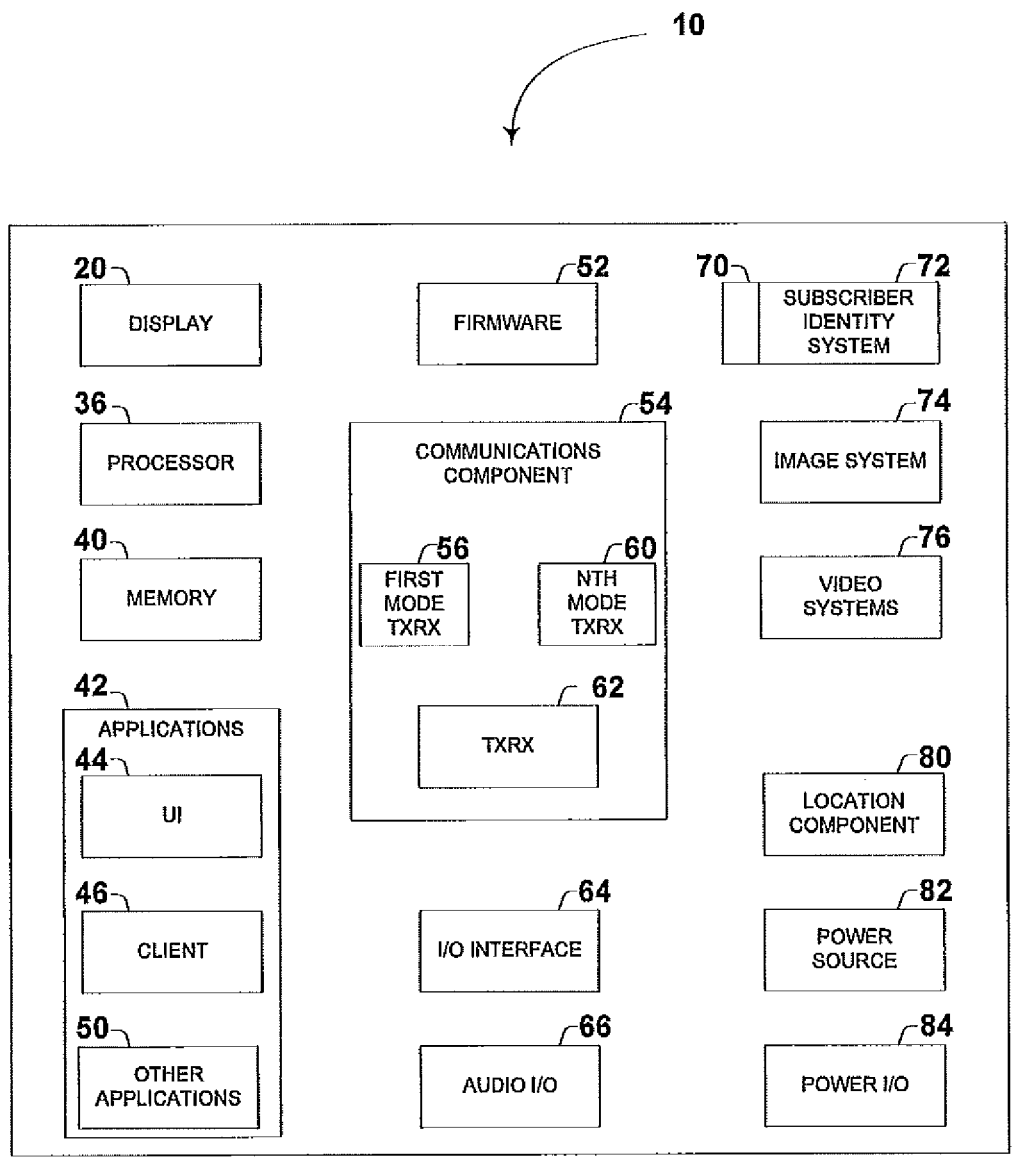
FIG. 2 is a schematic diagram of an exemplary communications device.

FIG. 2 illustrates a schematic block diagram of an exemplary mobile communications device 10 for use in accordance with an exemplary embodiment of the present invention. Although no connections are shown between the components illustrated and described in FIG. 2, the components can interact with each other to carry out device functions.

As illustrated, the mobile communications device 10 can be a multimode handset. FIG. 2 and the following discussion are intended to provide a brief, general description of a suitable environment in which the various aspects of an embodiment of the present invention can be implemented. While the description includes a general context of computer-executable instructions, the present invention can also be implemented in combination with other program modules and/or as a combination of hardware and software.

Generally, applications can include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 10 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD-ROM, DVD, or other optical disk storage, magnetic tape, magnetic disk storage or other magnetic storage devices, or any other medium that can be used to store the desired information and that can be accessed by the device 10.

The device 10 can include a processor 36 for controlling, and/or processing data. A memory 40 can interface with the processor 36 for the storage of data and/or applications 42. An application 42 can include, for example, video player software, a web browser, an instruction execution application, user feedback component software, combinations thereof, and the like. The application 42 can also include a user interface (UI) application 44. The UI application 44 can interface with a client 46 (e.g., an operating system) to facilitate user interaction with device functionality and data, for example, answering/initiating calls, entering/deleting data, configuring settings, browsing the internet, address book manipulation, multimode interaction, and the like. The applications 42 can include other applications 50 such as, for example, firmware, add-ons, plug-ins, voice recognition, call voice processing, voice recording, messaging, e-mail processing, internet browsers, video processing, image processing, music play, combinations thereof, and the like, as well as subsystems and/or components. The applications 42 can be stored in the memory 40 and/or in a firmware 52, and can be executed by the processor 36. The firmware 52 can also store code for execution during initialization of the device 10.

A communications component 54 can interface with the processor 36 to facilitate wired/wireless communications with external systems including, for example, cellular networks, packet networks, VoIP networks, LAN, WAN, MAN, PAN, that can be implemented using WI-FI, WI-MAX, combinations and/or improvements thereof, and the like. The communications component 54 can also include a multimode communications subsystem for providing cellular communications via different cellular technologies. For example, a first cellular transceiver 56 can operate in one mode, for example, GSM, and an Nth transceiver 60 can operate in a different mode, for example UMTS. While only two transceivers 56, 60 are illustrated, it should be appreciated that a plurality of transceivers can be included. The communications component 54 can also include a transceiver 62 for unlicensed communications using technology such as, for example, WI-FI, WI-MAX, BLUETOOTH, infrared, IRDA, NFC, RF, and the like. The communications component 54 can also facilitate communications reception from terrestrial radio networks, digital satellite radio networks, Internet-based radio services networks, combinations thereof, and the like. The communications component 54 can process data from a network such as, for example, the Internet, a corporate intranet, a home broadband network, and the like, via an ISP, DSL provider, or broadband provider.

An input/output (I/O) interface 64 can be provided for input/output of data and/or signals. The I/O interface 64 can be a hardwire connection, such as, for example, a USB, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, monitor, display, an LCD, combinations thereof, and the like.

Audio capabilities can be provided by an audio 110 component 66 that can include a speaker 14 for the output of audio signals and a microphone 16 to collect audio signals.

The device 10 can include a slot interface 70 for accommodating a subscriber identity system 72 such as, for example, a SIM or universal SIM (USIM). The subscriber identity system 72 instead can be manufactured into the device 10, thereby potentially obviating the need for a slot interface 70.

The device 10 can include an image capture and processing system 74. Photos and/or videos can be obtained via an associated image capture subsystem of the image system 74, for example, a camera. The device 10 can also include a video component 76 for processing, recording, and/or transmitting video content.

A location component 80 can be included to send and/or receive signals such as, for example, GPS data, triangulation data, combinations thereof, and the like. The device 10 can use the received data to identify its location or can transmit data used by other devices to determine the device 10 location.

The device 10 can include a power source 82 such as batteries and/or other power subsystem (AC or DC). The power source 82 can interface with an external power system or charging equipment via a power I/O component 84.

Figure 3:
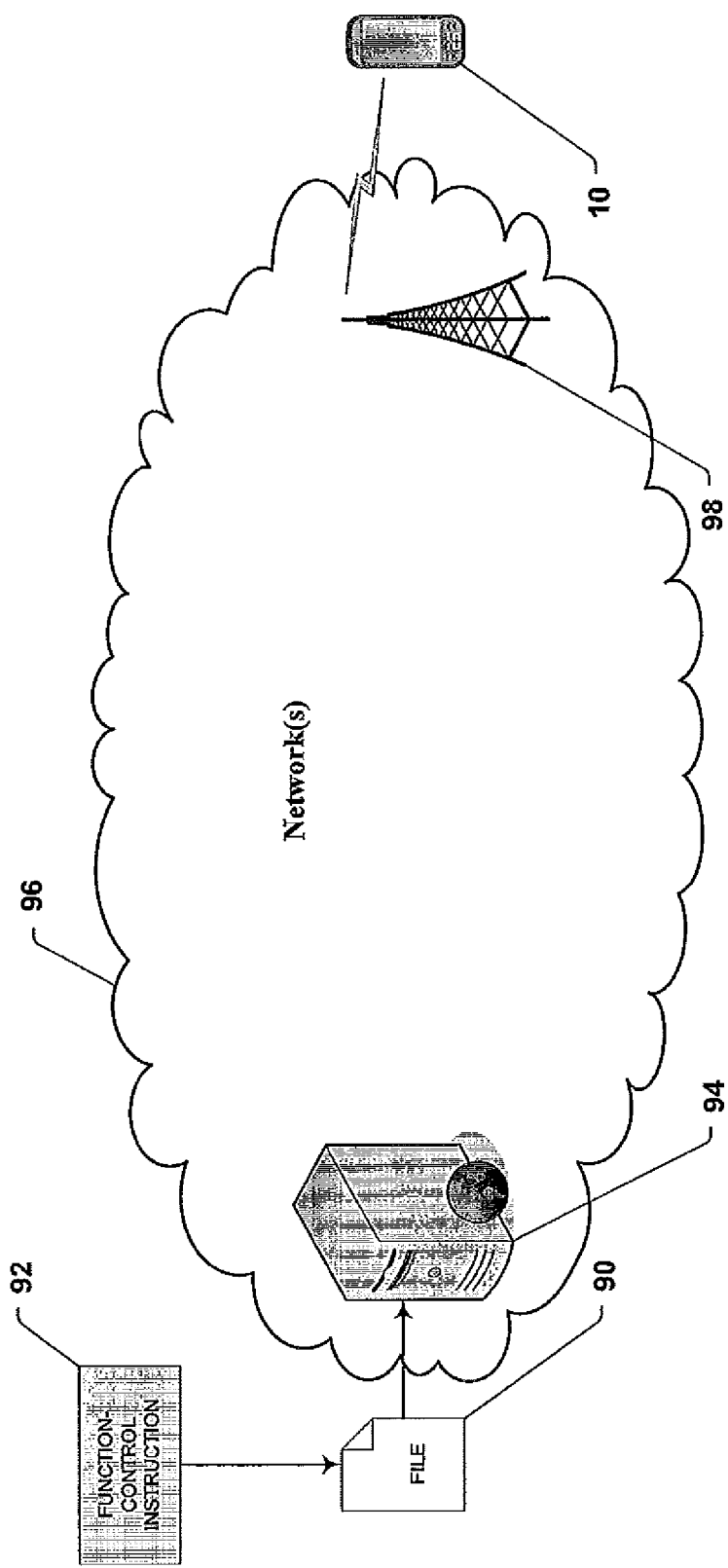
FIG. 3 is a schematic diagram of an exemplary system for passing a function-control instruction to a mobile communications device from a remote device.

Referring now to FIG. 3, an exemplary system that can be used to transfer one or more function-control instructions to one or more exemplary mobile communications devices 10 is schematically illustrated. While many devices and/or components may be necessary to perform the tasks described, these devices and/or components are not illustrated in FIG. 3 in order to simplify description. Furthermore, it is noted that network components and/or devices are well known and need not be explained in detail.

One or more electronic files 90 can be created. An electronic file 90 can be, for example, a web page document. Web page documents can be at least partially written or scripted in any language, including, but not limited to, CCXML, CSS, CGI, DOM, HTML, InkML, OWL, RDF, SVG, SMIL, SSML, WSDL, XACML, XFDL, XHTML, XML, combinations thereof, and the like. An electronic file 90 can also be an image, a video, a text document, an MMS message, an SMS message, a sound clip, combinations thereof, and the like. An electronic file 90 can be sent to one or more electronic devices including, but not limited to, a personal computer, a mobile communications device 10, a PDA, a laptop, and the like.

One or more function-control instructions 92 can be created and appended, inserted, or otherwise included in the file 90. Alternatively, one or more function-control instructions 92 can be the file 90. A function-control instruction 92 can be written in any machine-readable format. For example, a function-control instruction 92 can be a CGI script, a JAVA script, a META tag, and the like, though other formats and languages for a function-control instruction 92 are both possible and contemplated. A function-control instruction 92 can selectively control any desired function of a mobile communications device 10.

For example, a function-control instruction 92 can control the backlight function of a display 20 of a mobile communications device 10. As explained above, the term "backlight," as used in the specification and the claims, is intended to include any method of making a display 20 more visible to a user. Such lighting capabilities may be particularly useful in, for example, low- or no-light conditions. Methods of backlighting include, but are not limited to, the placing of a light source behind, in front of, or to the side of a display 20. Acceptable light sources include, but are not limited to, an electroluminescent panel (ELP), one or more light emitting diodes (LEDs), an incandescent light source, combinations or equivalents thereof, and the like.

A function-control instruction 92 can also control other functions or features of a mobile communications device 10, for example, the playing of sound clips, ring tones, feedback tones, dialing modes, transfer mediums, display backgrounds, image displays, the playing of video clips, combinations thereof, and the like. Support for controlling any function with a function-control instruction 92 can be included in a device 10 as, for example, an application or a software program. An application or software program can be stored in a device firmware 52, a memory 40, or any other suitable location. Therefore, any function can be controlled by a function-control instruction 92. It should be noted, however, that a mobile communications device 10 or other recipient electronic device can ignore a function-control instruction 92 if desired. For example, a user of a device 10 can select an option included on the device 10 that turns off, or overrides, an instruction execution application, or function-control instructions from a designated source. In this manner, some or all function-control instructions 92, from some or all sources, can be ignored by a device 10.

A file 90, including one or more function-control instructions 92, can be loaded onto a suitable storage device 94 with access to, or located on, one or more networks 96. The storage device 94 can include, for example, a storage component, e.g., a hard disk drive, an optical storage medium, a flash drive, a memory, and the like, of a personal computer, a server, a disk array, a memory of another mobile communications device 10, combinations thereof, and the like. A network 96 can include, for example, a packet network such as the Internet, a local area network (LAN), a wireless local area network (WLAN), a wide area network (WAN), a personal area network (PAN), an extranet, an intranet, a cellular network, a PSTN network, a wireless network, combinations or equivalents thereof, and the like.

The networks 96 can also include a wireless transmitter 98. The wireless transmitter 98 can include a cellular tower, a radio tower, a Wi-Fi transmitter, a BLUETOOTH® transmitter, an infrared transmitter, an NFC transmitter, combinations thereof, or any other means for transmitting signals.

As illustrated, the wireless transmitter 98 can wirelessly communicate with a mobile communications devices 10 using at least one protocol supported by the wireless transmitter 98 and a mobile communications device 10. A file 90, one or more function-control instructions 92, or a combination thereof, can be transferred from the storage device 94 to one or more mobile communications devices 10 over a network 96, one or more wireless transmitters 98, or a combination thereof.

It should be understood that a mobile communications device 10 can request, and/or receive, one or more files 90, function-control instructions 92, or combinations thereof, at any given time. Similarly, a mobile communications device 10 can create a file 90, and/or a function-control instruction 92 for transfer to a storage device 94 or another mobile communications device 10. In other words, files 90 and function-control instructions 92 can be transferred to and from one or more mobile communications devices 10 and storage devices 94.

It should also be understood that a file 90 with a function-control instruction 92 can be transmitted from a mobile communications device 10 to one or more other mobile communications devices 10. A function-control instruction 92 can be attached to a video clip and sent from a first mobile communications device 10 to a second mobile communications device (not illustrated). As an illustrative example, a first user may want to send a video clip, i.e., a file 90, with a certain duration to a second user. The first user can create the file 90, and specify a function-control instruction 92 that instructs a device 10 to turn the backlight on for the duration of the video clip. For example, if the video clip is 37 seconds long, the function-control instruction 92 can specify that the device 10 turn the backlight on for 37 seconds. The first device 10 can send a file 90 to a second device with a function-control instruction 92 as an attachment to an email, an MMS message, a web page, or using any other transfer medium.

Figure 4:
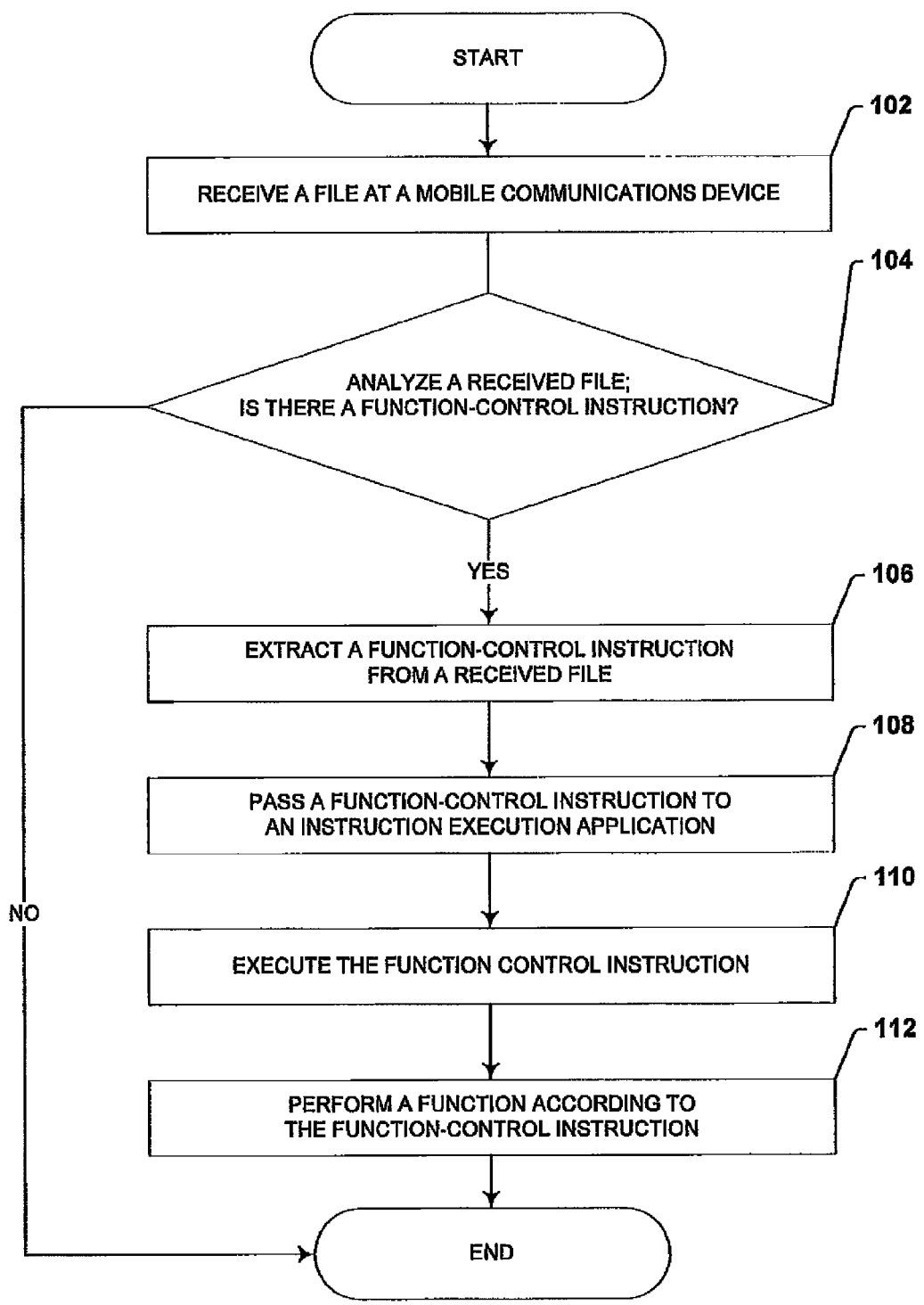
FIG. 4 schematically illustrates a method of implementing a function-control instruction at a mobile communications device, according to an exemplary embodiment of the present invention.

Referring now to FIG. 4, a method for implementing function-control instructions 92 at mobile communications devices 10, according to an exemplary embodiment of the present invention is illustrated. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In block 102, a mobile communications device 10 can receive a file 90. As mentioned above, the file 90 can include one or more function-control instructions 92. Alternatively, the file 90 can itself be one or more function-control instructions 92.

In block 104, the received file(s) 90 can be analyzed to determine if a file 90 is a function-control instruction 92, or if a function-control instruction 92 is attached, embedded, or otherwise included with the file 90. If a function-control instruction 92 is recognized, then the process can continue with block 106. If there is no function-control instruction 92 included in the file 90, or if the file 90 is not a function-control instruction 92, then the process can end.

At block 106, the function-control instruction 92 can be extracted from the file 90. After the function-control instruction 92 is extracted from a file 90, or if the file 90 is a function-control instruction 92, then the process can continue with block 108.

It should be understood that the analysis step of block 104 can occur during, for example, execution, decoding, compiling, or reading of the file 90. For example, if the file 90 is a webpage, then the function-control instruction 92 may be appended as a META tag. In such a case, a web browser can recognize and extract the function-control instruction 92 while reading the file 90. The web browser can pass the function-control instruction 92 to an instruction execution application before, during, or after execution of the remainder of the file 90. Alternatively, the file 90 can be executed after the process schematically illustrated in FIG. 4 has ended or while the process is being carried out.

In block 108, a function-control instruction 92 can be passed to an instruction execution application located on the device 10. As explained above, the instruction execution application can be a software program, subroutine, or application that resides in a device firmware 52, a flash drive 40, a hard drive, and the like. Alternatively, an instruction execution application can be located on a SIM 72. Regardless of where the instruction execution application is located, the instruction execution application can receive the function-control instruction 92 from the device 10.

In block 110, the instruction execution application can read the function-control instruction 92 to determine to what function the function-control instruction 92 pertains, and/or any other parameters relating to the execution of the function-control instruction 92. Once the function-control instruction 92 is read, the instruction execution application can pass instructions to the mobile communications device 10.

In block 112, the device 10 can perform a function according to the directives included in the transferred function-control instruction 92. After performing the function as directed by the function-control instruction 92, the process can end. The process illustrated in FIG. 4 can be repeated for each function-control instruction 92 included in a file 90 or otherwise transferred to a mobile communications device 10.

Figure 5:
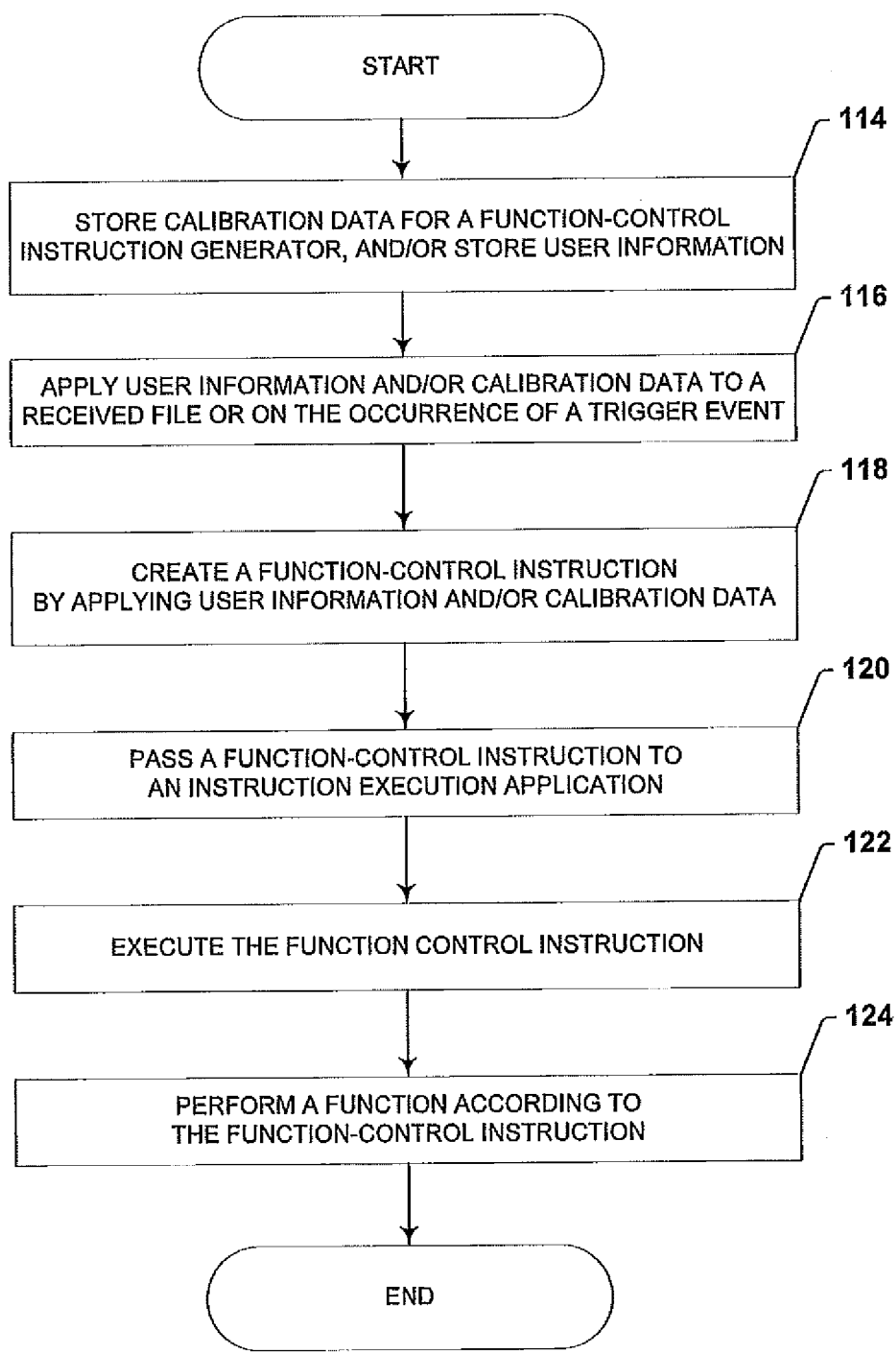
FIG. 5 schematically illustrates a method of creating and implementing a function-control instruction at a mobile communications device, according to an exemplary embodiment of the present invention.

Referring now to FIG. 5, a method for creating and implementing function-control instructions at mobile communications devices 10, according to an exemplary embodiment of the present invention, is schematically illustrated. It should be understood that the steps described are not necessarily presented in any particular order and performance of some or all the steps in an alternative order(s) is possible and is contemplated. The steps have been presented in the demonstrated order for ease of description and illustration. Steps can be added, omitted and/or performed simultaneously without departing from the scope of the appended claims. Some or all steps of this process, and/or substantially equivalent steps, can be performed by execution of computer-readable instructions included on a computer readable medium.

In block 114, a function-control instruction generator is calibrated by a user. The function-control instruction generator can be part of a software or hardware program, or both. For example, the function-control instruction generator can be an application included in a web browsing application or can be a program included in a device firmware 52. A function-control instruction generator can also be an application included in software used for viewing SMS messages, email messages, MMS messages, video clips, slide shows, images, camera input, and the like.

To calibrate a function-control instruction generator, a user can interface with a software package to create rules, user information, or both. For example, a user can calibrate a function-control instruction generator by interfacing with a device while reading sample text documents. Several blocks of text can be displayed, and the user can indicate when the text has been read. As such, the function-control instruction generator can determine the user's reading speed. Some files can have images, and the like, to take into account the average time added by adding an image to a document. The reading speed of the user can be stored as a per-character, per-word, per-page, per-image, or other file-based characteristic. A reading speed of the user can also include a buffer that adjusts a measured reading speed, if desired. Additionally, a buffer can be dynamically adjusted depending upon any number of factors, including, but not limited to, the number of images in a received file, the average length of words in a block of text, the type of content, e.g., sports, news, technical data, the time of day, other tasks running on the device, or any other factors.

As will be explained below, the reading speed can be applied to any text that is later displayed on the device to determine, for example, how long the device backlight should be turned on to allow the user to read the entire document. Once such a determination is made, the time for which the backlight is to be activated can be passed to an instruction execution application as a function-control instruction. The instruction execution application can then pass instructions to the device to turn on the backlight for the determined span of time. At any time, for example, if a user's reading speed changes, the function-control instruction generator can be re-calibrated by the user. Similarly, the function-control instruction generator can periodically, continuously, or upon demand, update reading speed, or any other user- or device-based parameter.

In addition to, or instead of, calibrating a function-control instruction generator, user information can be stored in a function-control instruction generator. For example, a user's ZIP code can be stored and various functions can be based on this, or other, information. One contemplated example involves passing a ZIP code and associated instructions as a function-control instruction to an instruction execution application. The instruction execution application can then pass instructions to a desired component or software application and weather, traffic, news, or other information specific to a ZIP code can be downloaded to the device and displayed for the user. Of course, the current ZIP code in which a device 10 is located can be determined using other methods. For example, a ZIP code can be passed to a device by a network node.

Another contemplated embodiment involves the storage of a user's service provider and/or account information. When a software application, such as a web browser, is initiated or performs any other trigger event, graphics, sound, account balances, sales information, or other content can be displayed for the user based upon the entered user information. This can be done by passing the user information to an instruction execution application as a function-control instruction.

Proceeding now to block 116 of FIG. 5, the stored user information or calibration information can be applied when viewing files or data on a device. Additionally, or in the alternative, the stored user information or calibration information can be applied upon a desired trigger event, for example, when a software package, application, program, routine, subroutine, task, or even the device itself, is initiated, completed, powered up, or powered down.

In block 118, the application or software can create a function-control instruction by applying the user information and/or calibration information as mentioned in block 116. As explained above, a browser could include, for example, an option to download weather information based on a user-entered or device-determined ZIP code. An application could determine or retrieve a ZIP code, and pass a ZIP code and instructions to an instruction execution application as a function-control instruction. Any function of a device can be controlled by specifying tasks and parameters in a user application such as, for example, a web browser.

In block 120, the application can pass the function-control instruction to an instruction execution application, as explained above.

In block 122, the instruction execution application can read, decode, or otherwise examine the function-control instruction to determine to what function the function-control instruction pertains, and/or what parameters of a desired function are controlled by the function-control instruction. This step can occur substantially as described in block 110 of FIG. 4.

In block 124, the instruction execution application can pass instructions to the device to execute the desired function according to the directives of the function-control instruction, as determined by the instruction execution application.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A tangible computer-readable storage device comprising computer-executable instructions that, when executed by a processor, cause the processor to perform operations, for controlling a function of a mobile communications device, comprising:
storing a function-control command for use in executing the function of the mobile communications device;
calibrating the function-control command, based on user input to the mobile communications device, yielding a calibrated function-control command, wherein the calibrating comprises:
presenting sample media to the user of the mobile communications device;
evaluating a speed at which the user consumes the media, during a speed evaluation operation; and
generating the calibrated function-control command using results of the speed evaluation operation;
communicating the calibrated function-control command, created using the results of the speed evaluation operation, to an command-execution application of the mobile communications device;
executing the calibrated function-control command created using the results of the speed evaluation operation; and
performing the function in accord with the calibrated function-control command created using the results of the speed evaluation operation;
wherein the calibrated function-control command is based on at least one factor selected from a group of factors consisting of:
a number of images associated with performance of the function;
a length of words in a block of text associated with performance of the function;
a type of content associated with performance of the function;
a time of day; and
another task running on the mobile communications device.

2. The tangible computer-readable storage device of claim 1, wherein the function-control command relates to at least one feature selected from a group of features consisting of: backlighting; and device sound.

3. The tangible computer-readable storage device of claim 1, wherein the media includes at least one item selected from a group consisting of: text; an image; and a webpage.

4. The tangible computer-readable storage device of claim 1, wherein:
the user input is a first user input; and
the operations further comprise:
re-calibrating the calibrated function-control command, based on a second input, to form a re-calibrated function-control command;
communicating the re-calibrated function-control command to the command-execution application of the mobile communications device;
executing the re-calibrated function-control command; and
performing the function in accord with the re-calibrated function-control command.

5. The tangible computer-readable storage device of claim 4, wherein the operations further comprise re-calibrating, automatically and periodically, the function-control instruction.

6. A method, for remotely controlling a function of a mobile communications device, comprising:
storing, by a processor, to a tangible computer-readable storage medium of a network device, a file including at least two distinct components: (i) a function-control instruction and (ii) an executable remainder, wherein:
the executable remainder includes an executable file to be executed at the mobile communications device;

the function-control instruction includes directions advising the mobile communications device on a manner by which the mobile communications device should execute the executable remainder; and communicating, by the processor, the file, including the executable remainder and the function-control instruction, from the network device to the mobile communications device for executing the function-control instruction and performing the function associated with the executable remainder in accord with the function-control instruction;

wherein:

the function-control instruction relates to a speed by which a user of the mobile communications device is expected to consume media associated with the executable remainder; and the function-control instruction is based on at least one factor selected from a group of factors consisting of:

a number of images associated with the executable remainder;

a length of words in a block of text associated with the executable remainder;

a type of content associated with the executable remainder; a time of day; and another task running on the mobile communications device.

7. The method of claim 6, wherein:

the function-control instruction is a first function-control instruction, the directions are first directions, and the manner is a first manner;

the file includes at least three distinct components: (i) the first function-control instruction, (ii) the executable remainder, and (iii) a second function-control instruction including second directions advising the mobile communications device on a second manner by which the mobile communications device should execute the executable remainder; and the communicating the file includes communicating the file including the executable remainder, the first function-control instruction, and the second function-control instruction, from the network device to the mobile communications device for executing the first function-control instruction and the second function-control instruction and performing the function associated with the executable remainder in accord with the first function-control instruction and the second function-control instruction.

8. The method of claim 7, wherein the second function-control instruction relates to timing of a backlighting function of the mobile communications device in connection with executing the remainder.

9. The method of claim 6, wherein the function and the function-control instruction relate to at least one device feature selected from a group of device features consisting of:

(i) backlighting, in which case:

a. the executable remainder relates to visual media; and b. the function-control instruction instructs the mobile communications device to effect a backlight of the mobile communications device for a pre-determined span of time during presentation of the visual media to a user of the mobile communications device; and (ii) a device sound, in which case the executable remainder relates to audible media.

10. The method of claim 6, wherein the file is communicated by way of a webpage.

11. The method of claim 6, wherein the executable remainder includes at least one visual media selected from a group consisting of: a video clip; an image; and text.

12. The method of claim 6, wherein:

the mobile communications device is a first mobile communications device; and storing the file to the computer-readable storage medium of the network device and communicating the file from the network device to the mobile communications device is performed by the processor being a part of a second mobile communications device storing the single file to the computer-readable storage medium of the network device and communicating the file to the first mobile communications device.

13. The method of claim 6, wherein the function-control instruction directs the mobile communications device of a rate by which to display the media.

14. The method of claim 6, wherein the mobile communications device includes an override setting causing the mobile communications device to disregard the function-control instruction of the file in executing the executable remainder.

15. The method of claim 6, wherein: the mobile communications device is a first mobile communications device; and the network device is a second mobile communications device.

16. A tangible computer-readable storage device comprising computer-executable instructions that, when executed by a processor, cause the processor to perform operations, for remotely controlling a function of a mobile communications device, comprising:

storing, to a network device, a file including at least two distinct components: (i) a function-control command and (ii) an executable remainder, wherein:

the executable remainder includes an executable file to be executed at the mobile communications device;

the function-control command includes directions advising the mobile communications device on a manner by which the mobile communications device should execute the executable remainder; and communicating the file, including the executable remainder and the function-control command, from the network device to the mobile communications device for executing the function-control command and performing the function associated with the executable remainder in accord with the function-control command;

wherein:

the function-control command relates to a speed by which a user of the mobile communications device is expected to consume media associated with the executable remainder; and the function-control command is based on at least one factor selected from a group of factors consisting of:

a number of images associated with the executable remainder;

a length of words in a block of text associated with the executable remainder;

a type of content associated with the executable remainder; a time of day; and another task running on the mobile communications device.

17. The tangible computer-readable storage device of claim 16, wherein:

the function-control command is a first function-control command, the directions are first directions, and the manner is a first manner;

the file includes at least three distinct components: (i) the first function-control command, (ii) the executable remainder, and (iii) a second function-control command including second directions advising the mobile communications device on a second manner by which the mobile communications device should execute the executable remainder; and the communicating the file includes communicating the file including the executable remainder, the first function-control command, and the second function-control command, from the network device to the mobile communications device for executing the first function-control command and the second function-control command and performing the function associated with the executable remainder in accord with the first function-control command and the second function-control command.

18. The tangible computer-readable storage device of claim 16, wherein:

the mobile communications device is a first mobile communications device; and storing the file to the computer-readable storage device of the network device and communicating the file from the network device to the mobile communications device is performed by the processor being a part of a second mobile communications device storing the single file to the computer-readable storage device of the network device and communicating the file to the first mobile communications device.

19. The tangible computer-readable storage device of claim 16, wherein the function-control command directs the mobile communications device of a rate by which to display the media.

20. The tangible computer-readable storage device of claim 16, wherein the mobile communications device includes an override setting causing the mobile communications device to disregard the function-control command of the file in executing the executable remainder.

* * * * *